United States Patent [19]

Krogmann

[11] 4,114,437
[45] Sep. 19, 1978

[54] NAVIGATION INSTRUMENT FOR THE NAVIGATION OF LAND VEHICLES

[75] Inventor: Uwe Krogmann, Überlingen, Fed. Rep. of Germany

[73] Assignee: Bodenseewerk, Bodensee, Fed. Rep. of Germany

[21] Appl. No.: 818,153

[22] Filed: Jul. 22, 1977

[30] Foreign Application Priority Data

Dec. 27, 1976 [DE]  Fed. Rep. of Germany ....... 2659094

[51] Int. Cl.² ............................................. G01C 21/00
[52] U.S. Cl. .................................. 73/178 R; 364/450; 364/453
[58] Field of Search ............ 73/178 R; 364/450, 453, 364/444, 449, 424; 180/98; 244/175

[56] References Cited

U.S. PATENT DOCUMENTS 3,849,636  11/1974  Helms ................................. 364/450

FOREIGN PATENT DOCUMENTS 478,186  7/1975  U.S.S.R. ................................ 73/178 R

*Primary Examiner*—Donald O. Woodiel
*Attorney, Agent, or Firm*—Darbo & Vandenburgh

[57] ABSTRACT

The vehicle is operated over land which is described by a grid coordinate system having a north direction offset from geographic north. The vehicle has a pick-up to determine its heading speed along its longitudinal center line. The spin axis of a free gyro establishes a reference axis. A meridian gyro determines the angle, if any, between said reference axis and geographic north at the start of a mission. At the start of the mission a computer is supplied with information as to the starting point in said grid coordinate system, the angle between geographic north and grid north, and an estimated corrective factor (based on the type of terrain to be traversed) to be applied to the measured heading speed. The computer continuously determines, for display, the position of the vehicle in said grid system. Upon the vehicle reaching a landmark whose coordinates in said grid system are known, the correct coordinates for the then location of the vehicle are supplied to the computer and the computer determines the error in the estimated corrective factor and thus determines a revised corrective factor to be employed upon leaving said landmark.

9 Claims, 6 Drawing Figures

NAVIGATION INSTRUMENT FOR THE NAVIGATION OF LAND VEHICLES

BACKGROUND AND SUMMARY OF THE INVENTION

The invention relates to a navigation instrument for the navigation of land vehicles within a grid coordinate system by means of a heading reference unit.

It is known in sea navigation to determine the position of the ship from heading and speed. The speed is determined by means of a suitable log. The position is determined graphically on the nautical map. This kind of navigation is rather inaccurate as the compass measures only the direction between the longitudinal ship axis and the north direction, and the log measures only the speed of the ship through the water so that with this navigation procedure drift or leeway are not taken into consideration.

It is the object of the invention to provide a navigation instrument for the navigation of land vehicle which allows navigation without referring to landmarks such as roads, buildings and the like, and which indicates the position of the land vehicle very accurately. For this purpose, especially for military applications, the navigation is quite often not performed in a coordinate system based on geographical longitude and latitude but within an arbitrary grid coordinate system. Moreover, the position of this grid coordinate system in relation to the geographical coordinate system of longitude and latitude can, similar to a code, be established arbitrarily in order to conceal from the enemy the positions indicated within this grid coordinate system.

To achieve this object, a navigation instrument is provided in accordance with the invention characterized by (a) a north seeking meridian gyro to determine the north direction,
(b) a free gyro initially oriented with respect to the meridian gyro and used as a heading reference unit,
(c) a movement pick-up for generating a signal representing the movement of the vehicle,
(d) a computer connected to the heading reference unit and the movement pick-up, and arranged to generate output signals indicative of the vehicle position within the grid coordinate system from the grid heading angle signals and the movement signals provided by the heading reference unit and by the movement pick-up, and
(e) means for compensating for the deviation of the free gyro relative to the grid coordinate system due to the earth's rotation by applying a follow-up signal to the gyro or by feeding this deviation into the computer.

The north seeking meridian gyro allows an accurate determination of the north direction prior to starting on a mission. The free gyro as a heading reference unit is oriented after the north direction thus determined. During the mission the computer then continuously determines the position within the grid coordinate system from the grid heading angles and the movement signals. Since in a land vehicle (which excludes a boat) the angle between longitudinal axis of the vehicle and heading reference rather accurately represents the direction of movement of the land vehicle, the heading can be determined exactly by the meridian gyro and the free gyro, the movement of the vehicle over land can also be measured rather accurately and, eventually, the evaluation is effected by means of a computer, the method of the invention — other than similar methods in sea and air navigation — permit a very accurate determination of the position.

The movement pick-up may be a speed pick-up or a distance pick-up.

A free gyro located in a vehicle tends to maintain its direction in space. This has the result that even if the gyro has its spin axis initially aligned exactly towards north, it slowly drifts from the north direction at an angle speed of $$\omega_Z = \omega_E \sin\phi + (V_{east}/R) tg\phi \qquad (1)$$

where
$\omega_E$ = speed of the rotation of the earth
$\phi$ = geographical latitude
$R$ = radius of the earth
$V_{east}$ = east component of the speed of the vehicle.

The gyro spin axis must be slaved continuously with this angular speed if it has to be kept in north direction. The first term on the right side of equation (1) results from the fact that the north direction parallel to the surface of the earth in the meridian plane varies in space with the rotation of the earth so that gyro spin axis, which is stable in space without slaving, drifts with respect to the north direction. Such a drift of the gyro spin axis also occurs with respect to the grid coordinate system likewise rotating in space together with the earth.

The second term in equation (1) results from the fact that for a motion in east-west direction, the north direction (i.e., the direction of the tangent to the corresponding meridian) varies independently of the rotation of the earth. Such a change, however, does not occur with respect to the grid coordinate system not related to the earth, coordinate axes of which coincide only at the origin of the coordinate grid with the east-west and north-south directions, respectively.

If the globe were assumed to be immobile, a motion of the land vehicle with the gyro in east direction would not demand any change of the grid reference direction in space so that neither the angle formed by the direction stable in sapce of the gyro reference and the direction of the grid reference would be influenced by this.

In order to establish a fixed direction of the grid reference by means of the gyro, it is only necessary therefore to compensate for, or to take into account, the influence of the rotation of the earth on the gyro spin axis. For this purpose it is possible that the compensating means are arranged to generate a follow-up signal $$\omega_{ZG} = \omega_E \sin\phi \qquad (2)$$

from the grid coordinates determined by the computer where, as indicated above, $\omega_E$ is the speed of rotation of the earth and $\phi$ is latitude.

It is, however, also possible that the computer is arranged to compute the deviation rate $\omega_{ZG}$ of the gyro from the determined grid coordinate and the geographical latitude which is derived therefrom, and to integrate that deviation rate with respect to time, taking into account the initial conditions, in order to determine the angle between the gyro reference direction and the grid reference direction, and in addition, the computer is arranged to take this angle into consideration during the generation of position output signals.

When the movement pick-up is a speed pick-up, the signal thereof is multiplied by the sine and cosine, respectively, of the respective grid heading angle and is integrated with respect to time, in order to determine the coordinates of the vehicle in the grid coordinate system. Due to an error $\Delta K_v$ of the scale factor of the speed pick-up there may be a distance error $\Delta S$. The error $\Delta K_v$ of the scale factor results in a speed error $$\Delta V = \Delta K_v \cdot V_{gem},$$

wherein $V_{gem}$ is the speed of the vehicle as measured by the speed pick-up. By integration, a distance error is calculated of $$\Delta S = \int \Delta V \, dt = \Delta K_v \int V_{gem} \, dt$$

$$\Delta S = \Delta K_v \cdot S_{gem}.$$

Electro-mechanical distance pick-ups are known which are either coupled directly to the drive wheels or are connected to a shaft of the gearbox of the vehicle. Thus such an electromechanical distance pick-up measures the number of revolutions of the drive wheels or of said shaft, respectively, and derives information therefrom as to the distance covered. The distance pick-up provides distance increment signals. The computer is arranged to multiply each distance increment signal, or a predetermined number of distance increment signals, by the sine and the cosine, respectively, of the grid heading angle and to sum up the products thus obtained, in order to derive the coordinates or the vehicle in the grid coordinate system.

Due to slip of the wheels or of the driving caterpillar track of the vehicle the information provided by the distance pick-up does not correspond exactly to the distance covered over ground. The relation between distance pick-up information and distance covered is not fixed and suitable for calibration but depends, for example, on the nature of the soil, the type of the topography and the weather conditions. Consequently, this may result in an error of the output signals from the computer indicating the position of the vehicle.

An equation for the distance error is valid which is formally identical with the above equation. A further source of error resides in a heading error $\Delta a_K$ by which the grid heading signal $a_K$ provided by the heading reference unit is affected. Also such a heading error may result in considerable navigation errors.

It is a further object of the invention to improve the accuracy of navigation instruments of the type mentioned above.

According to the invention this object is achieved in that the computer carries out the following operations:

(a) applying a corrective factor $W_A$ to the distance signal $S_{gem}$ measured as said movement signal or derived by integrating the speed to provide a corrected distance signal S on which the position computation is based, (b) computing the coordinates $x_F$, $Y_F$ representing the vehicle position in the grid coordinate system as output signals of the computer from the grid heading angle signal $a_K$ and the corrected distance signal S, (c) reading in of the coordinates $x_S$ and $Y_S$ of a known geodetic point whose position is established in the grid coordinate system, (d) forming the differences $\Delta x$, $\Delta Y$ of the coordinates $x$, $Y_F$, representing the vehicle coordinates and of the associated read-in coordinates $x_S$, $Y_S$ of the geodetic point, (e) determining the corrections $\Delta a_K$ and $\Delta W_A$ or $\Delta K_v$, respectively, of the grid heading angle signal and the corrective factor $W_A$, respectively, of the distance signal $S_{gem}$ in accordance with the equations:

$$\Delta W_A = \frac{\Delta x \cdot S_x + \Delta y \, S_y}{S_x^2 + S_y^2}$$

$$\Delta a_K = \frac{\Delta y \cdot S_x - \Delta x \, S_y}{S_x^2 + S_y^2}$$

wherein $S_x$ and $S_y$ are the coordinate differences between the start point of the vehicle and the said known geodetic point, (f) correcting the output signals $x_F$, $Y_F$ by the said differences $\Delta x$ and $\Delta y$, respectively, and (g) continuing to compute the coordinates representing the vehicle position in the grid coordinate system with the corrective factor $W_A$ corrected by the correction $\Delta W_A$ and with the grid heading angle corrected by the correction $\Delta a_K$.

Thus with a navigation instrument designed in accordance with the invention, coordinates of a known geodetic point may be read into the computer. These coordinates are compared to the coordinates computed by the computer from heading and speed. On the basis of the difference between the true location and the computed location the computer carries out the following operation:

1. It corrects the output signals, so that the indication is brought into agreement with the coordinates of the true location, namely that of the geodetic point.
2. For future position computation it corrects the grid heading angle signal $a_K$ and the corrective factor $W_A$ to be applied to the movement signal $s_{gem}$ in accordance with the past error to correct, for example, for the slip.

Thus after the vehicle has been driven from a start point to a geodetic point and at that point the corrections mentioned above have been applied to the computer, the further reading of the coordinates in the grid coordinate system will be effected with an accuracy that is considerably improved. It is essential in this connection that the coordinate errors $\Delta x$ and $\Delta y$ depend, as can be shown, only on the coordinate differences of the known start point and of said known geodetic point and do not depend on the path along which the vehicle proceeded from one point to the other.

"Geodetic point," in this connection, may be any landmark the coordinates of which are known very exactly. "Start point" may be the start point of the mission or a geodetic point in which the previous correction has been applied to the computer. For the computations commencing at the first "start point", the corrective factor $W_A$ to be applied to the measured distance may be read into the computer in accordance with empirical values taking the topographical and weather conditions into consideration.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
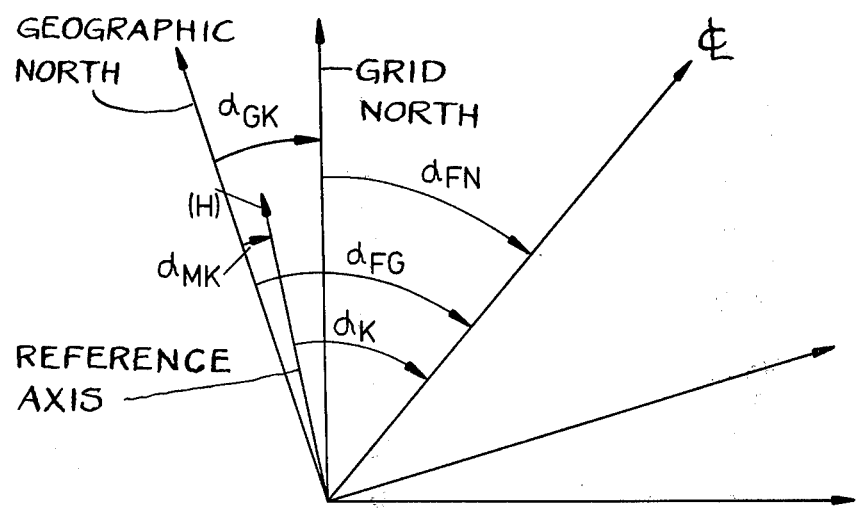
FIG. 1 shows the relative positions of the various directions for the illustration of the invention.

In FIG. 1, $\xi$ is the longitudinal axis of a land vehicle. This axis $\xi$ forms an angle $\alpha_{FG}$ with the geographic north direction and a grid heading angle $\alpha_{FN}$ with the "grid north" direction. Grid north and geographic north form an angle $\alpha_{GK}$ called the grid convergence angle. The angle $\alpha_K$ is the angle between the longitudinal axis and the reference axis (H) of the gyro reference unit 40, (FIG. 3) and the angle $\alpha_{MK}$ is the angle between the geographic north direction and the reference axis (H).

Figure 3:
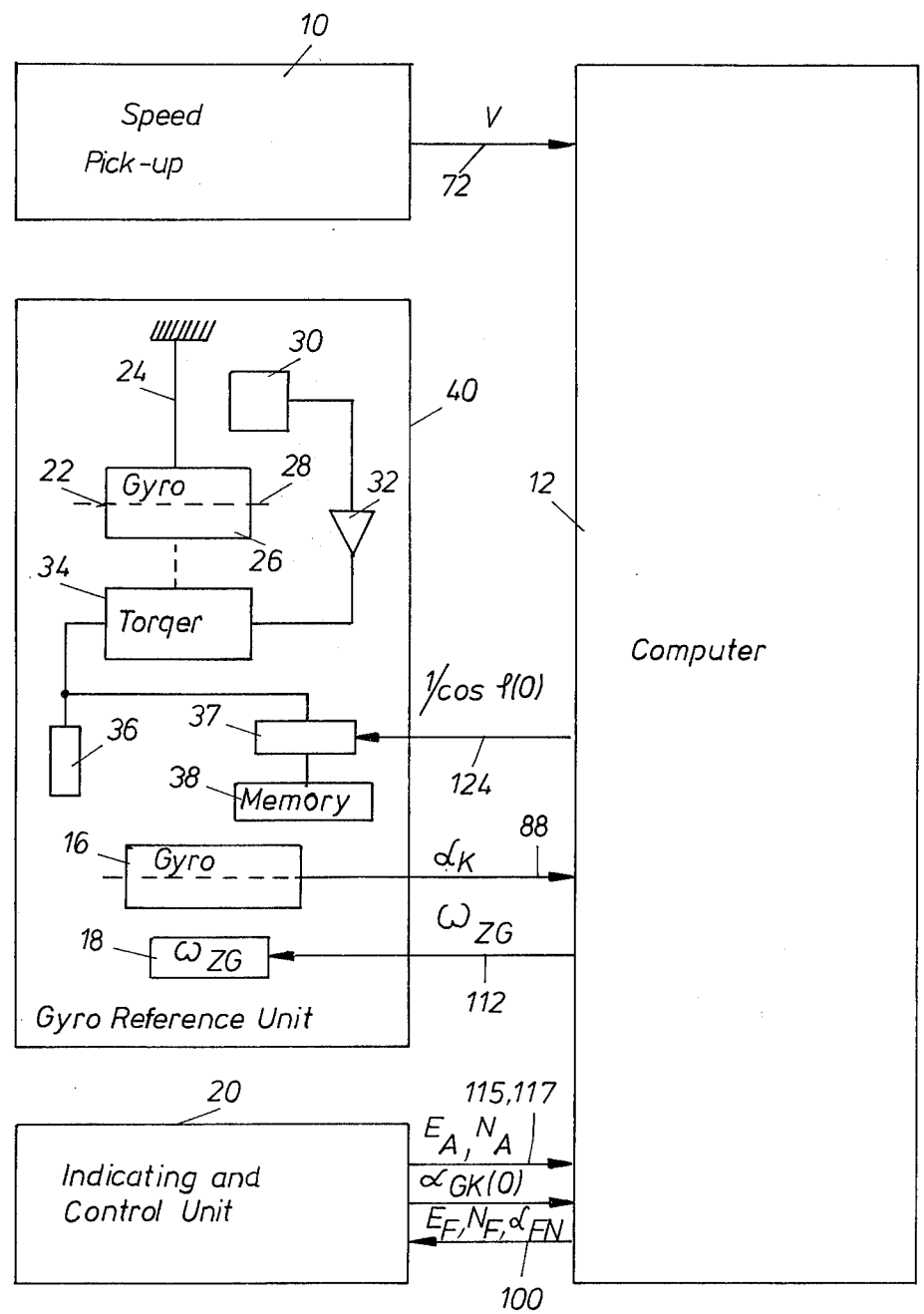
FIG. 3 is a block diagram of an instrument of the invention.

With reference to FIG. 3, a speed pick-up 10 generates a signal proportional to the vehicle speed V in direction of the longitudinal axis of the vehicle. This signal is applied to a computer 12 preferably in digital form. A signal $\alpha_K$ is applied to the computer from the gyro reference unit 40. This signal indicates the angular position of a free gyro 16 aligned to geographic north prior to the mission, or the position the reference axis of which has been exactly determined before the mission in relation to geographic north, and which is continuously acted upon by a torquer 18 applying a torque $\omega_{EG}$ according to equation (2) to compensate for the rotation of the earth. An indicating and control unit 20 is used to apply $E_A$, $N_A$ and $\alpha_{GK}(O)$, i.e. the initial position in grid coordinates $E_A$ and $N_A$, as well as the grid convergence angle $\alpha_{GK}(O)$ to the computer 12 prior to the mission. Prior to the mission, the geographic north direction is determined in a known way by means of a meridian gyro 22. This gyro 22 contains a gyro 26 suspended by a wire or tape 24. Such a gyro may be of the type illustrated and described in U.S. Pat. No. 3,750,300. The position of the gyro when its suspension is not torsionally stressed is referred to herein as the wire zero position, but the gyro is intentionally operated in a position such that its suspension wire is torsionally stressed, i.e., the gyro is offset from its wire zero position. A gyro directing torque acts on such a gyro, and this torque tends to align the spin axis 28 of the gyro 26 with geographic north. A pick-off 30 picks off the deviation of gyro 26 from its wire zero position. This pick-off signal is highly amplified by an amplifier 32 and applied to a torquer 34. This torquer exerts a torque about the suspension wire axis counteracting the gyro directing torque. Thus the gyro directing torque is practically compensated by a counter torque so that the gyro 26 is restrained to the zero position of its wire suspension. The current flowing through the torque 34 at any given time is proportional to the gyro directing torque and generates a corresponding voltage drop across a resistor 36 in series with the winding of torquer 34. The signal obtained in this way, multiplied by a signal $1/\cos\phi$ generated by computer 12, is stored in a memory unit 38. This signal represents the angle $\alpha_{MK}$ formed by geographic north and the reference axis H (FIG. 1). Reference axis H is the spin axis of gyro 16.

In one of the two procedures for obtaining the angle $\alpha_{FN}$ the suspension of gyro 16, at the start of the mission, is physically rotated so that the spin axis of that gyro corresponds to geographic north (as determined by the angle $\alpha_{MK}$ supplied by gyro 22). This physical rotation may be made manually, by servos, etc.

With $\alpha_K(t)$ from the gyro 16 and the $\alpha_{GK}(O)$ read in, the computer 12 generates $\alpha_{FN}(t)$ (i.e., the angle between grid north and the longitudinal axis of the vehicle) according to the equation $$\alpha_{FN}(t) = \alpha_K(t) - \alpha_{GK}(O) \quad (3)$$

As an alternative, the gyro 16 is not aligned in accordance with this angle $\alpha_{MK}$ in the memory 38 but rather is aligned initially so that its spin axis corresponds to the zero wire position of gyro 22. Then the $\alpha_{MK}$ angle signal from memory 38, in addition to angle $\alpha_K$, is fed into the computer, and the grid north angle is calculated therefrom according to $$\alpha_{FN}(t) = \alpha_{MK} + \alpha_K(t) - \alpha_{GK}(O). \quad (3a)$$

The following speed components within the grid coordinate system result from the speed V (t) and $\alpha_{FN}(t)$:

$$V_N(t) = V(t) \cos \alpha_{FN}(t) \quad (4)$$

$$V_E(t) = V(t) \sin \alpha_{FN}(t) \quad (5)$$

These values are integrated with respect to time by computer 12, taking into account the read-in initial values $E_A$ and $N_A$, in order to determine the position of the land vehicle within the grid coordinate system, as follows:

$$N_F(t) = \int_0^t V(\tau) \cos \alpha_{FN}(\tau) \, d\tau + N_A \quad (6)$$

$$E_F(t) = \int_0^t V(\tau) \sin \alpha_{FN}(\tau) \, d\tau + E_A \quad (7)$$

From the thus obtained grid coordinates $N_F$ and $E_F$, the computer then determines the geographical latitude $\phi(t)$ by using the socalled UTM-grid according to the following equation:

$$\phi_1 [\text{rad}] = -1.0439 \cdot 10^{-16} \cdot N_F^2 [m^2] + 1.581313 \cdot 10^{-7} N_F [m] \quad (8a)$$

$$b = 3.05241 \cdot 10^{-4} N_1^2 [\text{rad}^2] - 1.18979 \cdot 10^{-4} N_1 [\text{rad}] \quad (8b)$$

$$N_2 [m] = 10^{-3} b \, (E_F [m] - 500.0 \cdot 10^3)^2 \quad (8c)$$

$$N_1 [m] = n_F [m] - N_2 [m] \quad (8d)$$

$$\phi[\text{rad}] = -1.0439 \cdot 10^{-16} N_1^2 [m^2] + 1.581313 \cdot 10^{-7} N_1 [m] \quad (8e)$$

In this connection, the various factors have the required dimensions $m^{-2}$ or $m^{-1}$.

With the thus obtained value, the computer 12 generates the values $\omega_{ZG}$ according to equation (2) and $1/\cos\phi$. The influence of the earth rotation on the gyro 16 is compensated through signal $\omega_{ZG}$ by means of the torquer 18. The signal $1/\cos\phi$ compensates the influence of the geographical latitude on the gyro directing torque of the meridian gyro during the northing operation.

The structure or the programming of a computer in order to effect the above mentioned operations is known to one knowledgeable in the art and therefore is not described in detail herein.

Instead of slaving the gyro 16 through the torquer 18, the computer 12 also can be employed to obtain the drift of the gyro. To do this the following equation is used to replace equation (3):

$$\alpha_{FN}(t) = \alpha_K(O) = \int_0^t \omega_{ZG}(\tau) d_\tau - \alpha_{GK}(O) \quad (9)$$

Slaving errors can be excluded in this way. With the thus obtained $\alpha_{FN}(t)$, the grid coordinates $N_F$ and $E_F$ are formed in the computer according to equations (6) and (7).

In the often used UTM-grid, the indicated north and east coordinates are designated $N_F$ and $E_F$, respectively, the coordinate origin being given the arbitrary east coordinate of $5.10^5$ [m]. This offers the advantage that the coordinates, in the range used, are always positive. For simplicity, the computer utilizes an $xy$-coordinate system in which the coordinate origin has the coordinates (0,0), the $x$-axis pointing towards north (grid north) and the $y$-axis pointing towards east. The following considerations refer to such an $xy$-coordinate system.

Figure 2:
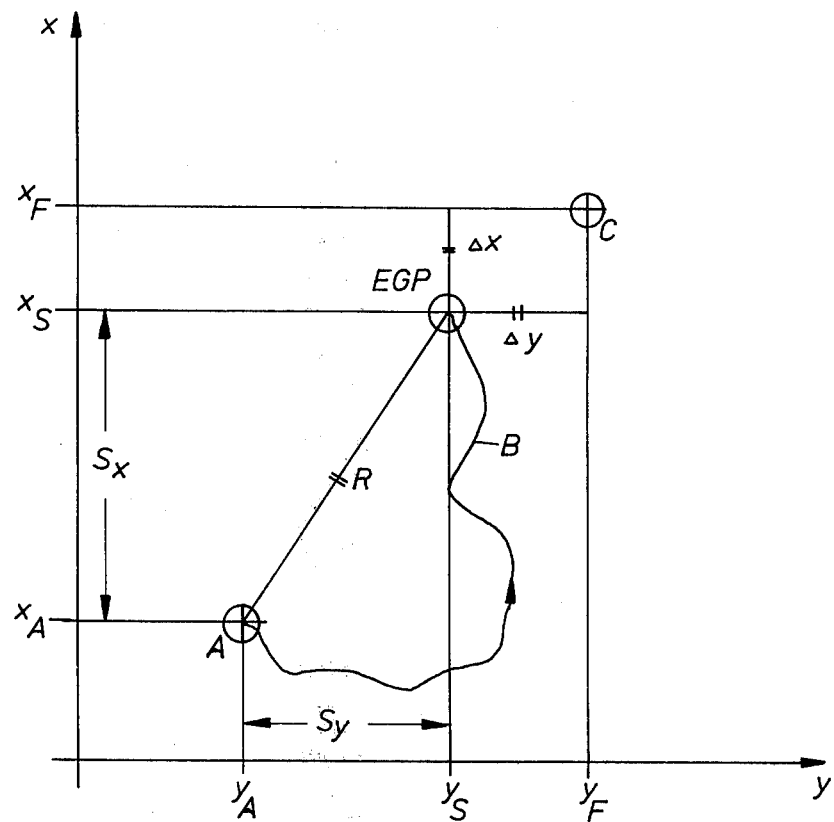
FIG. 2 shows part of the grid system and illustrates the basic idea of the invention.

In FIG. 2 the start point is designated A and a geodetic point is designated EGP. The known coordinates of the start point A are $x_A$ and $y_A$. The coordinates, also exactly known, of the geodetic point EGP are $x_S$ and $y_S$. Assume the vehicle moves along a path B from the start point A to the geodetic point EGP. The coordinate differences between the start point A and the geodetic point EGP are:

$$x_S - x_A = S_x$$

$$y_S - Y_A = S_y.$$

Due to errors of the grid heading angle signal $\alpha_K$ and of the corrective factor $W_A$ the navigation instrument will, however, not indicate the coordinates $x_S, y_S$ of the geodetic point EGP but the coordinates $x_F, y_F$ of the point C. The indication errors are:

$$\Delta x = x_F - x_S$$

$$\Delta y = y_F - y_S.$$

These indication errors are caused by an error $\Delta W_A$ of the corrective factor $W_A$ and an error $\Delta \alpha_K$ of the measured grid heading angle $\alpha_K$ as the main sources of errors. They are, independent of the course of the path B, thus are only functions of the distance components covered. This permits estimation of said main sources of errors from the resulting reading errors $\Delta x$ and $\Delta y$:

$$\Delta x = \Delta W_A \cdot S_x - \Delta \alpha_K \cdot S_y$$

$$\Delta y = \Delta W_A \cdot S_y + \Delta \alpha_K \cdot S_x,$$

$$\hat{\Delta W_A} = \frac{\Delta x \cdot S_x + \Delta y S_y}{S_x^2 + S_y^2}$$

$$\hat{\Delta \alpha_K} = \frac{\Delta y S_x - \Delta x S_y}{S_x^2 + S_y^2}.$$

With the estimated values thus derived of the main sources of errors the corrective factor $W_A$ (at first read in manually) as well as the grid heading angle $\alpha_K$, provided by the heading reference unit are corrected, during the further movement of the vehicle after passing the first geodetic point, as follows:

$$W_A = W_A - \Delta W_A$$

$$\alpha_K = \alpha_k - \Delta \alpha_K.$$

In this way not only the position itself is corrected by the processing of the "position support" information upon reaching a geodetic point, but in addition the corrective factor $W_A$ ("displacement adaptation factor") and the grid heading angle $\alpha_K$ are corrected for the future navigation. Thus the navigation instrument is always corrected by repeated position support during a mission, and thereby high accuracy is achieved.

The movement pick-up may be a speed pick-up as illustrated in FIG. 3, the signals of which are integrated in the computer to provide coordinate signals. However, it also may be a distance pick-up which responds to revolutions of the vehicle wheels, for example. To form the grid coordinates, each distance increment is multiplied by the sine and cosine, respectively, of the associated grid heading angle $\alpha_K$, and the coordinate increments thus obtained are added. Furthermore a corrective factor $W_A$ is fed into the computer at the start point, said factor resulting from empirical values and the respective distance increments being multiplied thereby.

Figure 4:
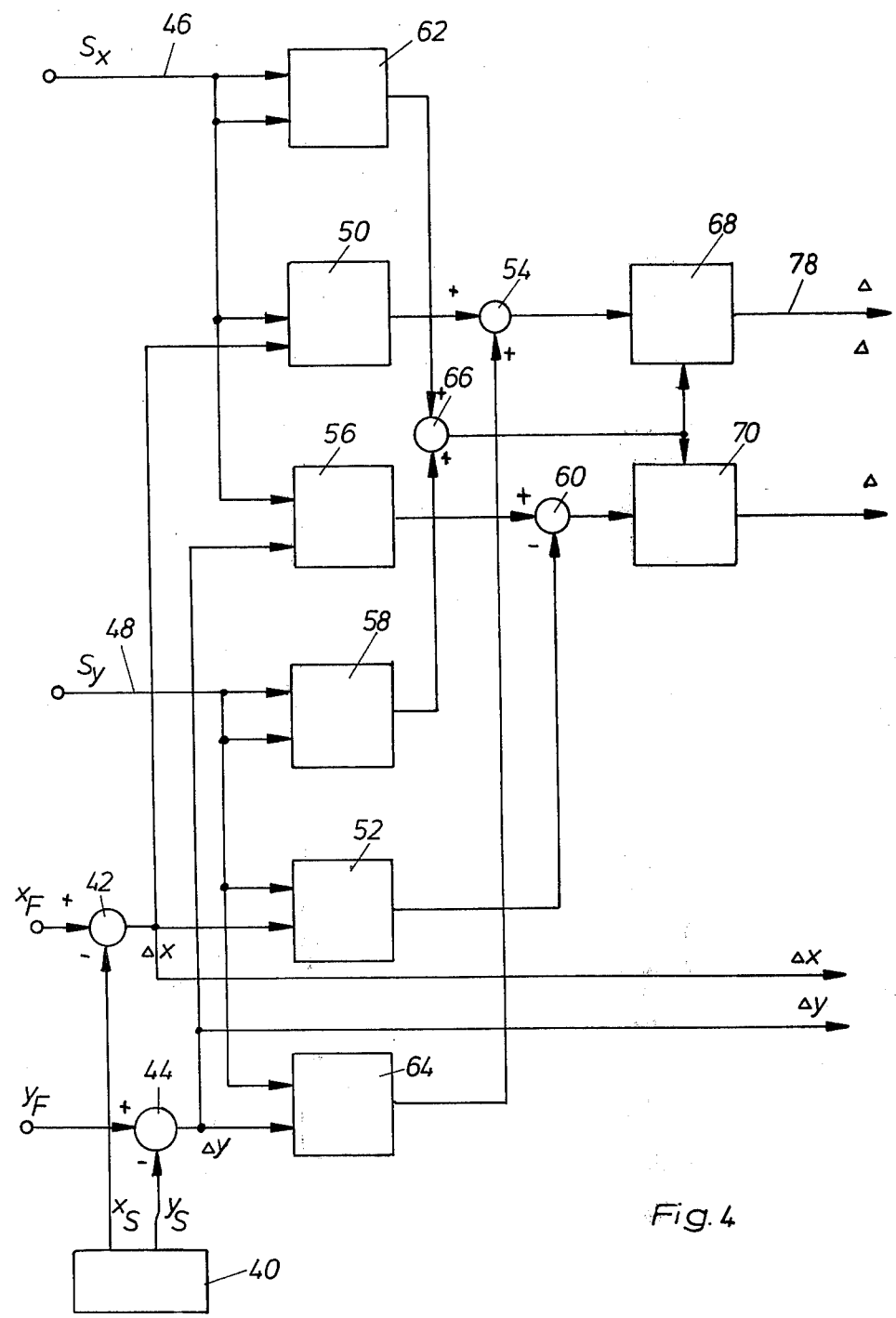
FIG. 4 is a block diagram of a computer for correcting the indication and the calculating operations in accordance with a geodetic point.

At a geodetic point EGP the coordinates thereof, $x_S$ and $y_S$, are fed into the computer through a control unit 40 (FIG. 4). If an EGP known in advance is to be approached, the settings of the coordinates may already be made prior to reaching the EGP. Subtractors 42 and 44, respectively, produce the difference of the coordinates $x_F, y_F$ provided by the computer as output signals, and of the coordinates $x_S$ and $y_S$, respectively, which had been read in. This yields the reading errors $\Delta x$ and $\Delta y$.

The coordinate differences or distance components $S_x$ and $S_y$ (FIG. 2) appear at the input terminals 46 and 48, respectively. The reading error $\Delta x$ and the signal representing the coordinate difference $S_x$ are applied to a multiplier 50. The reading error $\Delta y$ and the signal representing the coordinate difference $S_y$ are applied to a multiplier 64. An adder 54 forms the sum of the output signals from the multipliers 50 and 64, which signals correspond to $\Delta x \, S_x$ and $\Delta y \, S_y$, respectively.

In addition, the reading error $\Delta y$ together with the signal representing the coordinate difference $S_x$ are applied to a multiplier 56. The reading error $\Delta x$ together with the signal representing the coordinate difference $S_y$ are applied to a multiplier 52. A subtractor 60 produces the difference of the output signals from the multipliers 56 and 58, which signals correspond to $\Delta y\, S_x$ and $\Delta x\, S_y$, respectively.

The signal representing the coordinate difference $S_x$ is applied to both inputs of a multiplier 62. The signal representing the coordinate difference $S_y$ is applied to both inputs of a multiplier 58. Thus the output signals from these two multipliers 62 and 58 correspond to $S_x^2$ and $S_y^2$, respectively. An adder 66 adds these signals whereby a signal $S_x^2 + S_y^2$ is produced at the output of the adder.

A divider 68 divides the sum from adder 54 by the sum from adder 66. Thereby a signal representing the correction $\Delta W_A$ is generated which is fed into the computer 12 to correct $W_A$.

A divider 70 divides the difference from divider 60 by the sum from adder 66. Thereby a signal representing the correction $\Delta \alpha_K$ is generated which is fed into the computer 12 to correct the measured grid heading angle $\alpha_K$.

In addition, the signals from subtractors 42 and 44 which signals represent the reading errors $\Delta x$ and $\Delta y$ are fed into the computer 12. The coordinates $x_F$ and $y_F$ displayed as output signals of the computer are corrected for these reading errors.

The calculations can be carried out with analog signals. But the multiplying, dividing and summing elements may also work digitally.

Figure 5:
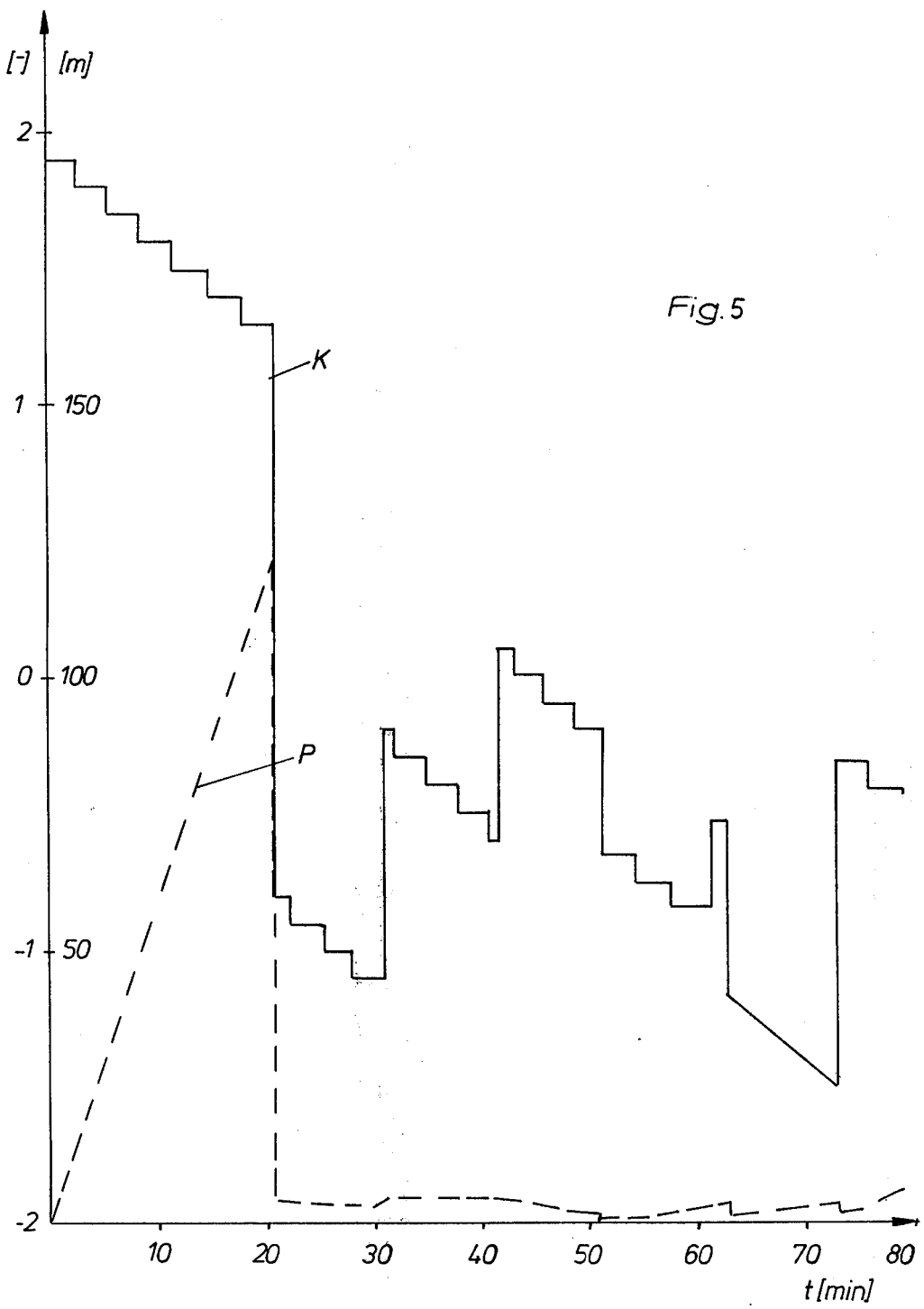
FIG. 5 illustrates the variation with time of the position and heading errors and demonstrates the effect achieved by the correction in accordance with FIG. 4.

The advantageous effect of the design of the navigation instrument of the invention is illustrated in FIG. 5. There the variation with time of the position error as well as the variation with time of the heading error are plotted for a typical path of the vehicle. The unit of the heading error $\Delta \alpha_K$ is "dash" ['] with $$1^{\cdot} = 360°/6400.$$

Position checks were made at geodetic points which were passed 21 minutes, 51.5 minutes, 63 minutes and 73 minutes after the start.

Prior to the first position check the position error increases substantially linearly (dashed line P) due to heading errors and errors of the corrective or distance adaptation factor $W_A$. By the first position check the position error is reduced to a value which is defined by the accuracy with which the position of the geodetic point is known. Without simultaneous correction of the sources of the error, the position error would thereafter increase again with about the same slope as before the position check. By determining the heading error $\Delta \alpha_K$ and the error $\Delta W_A$ of the distance adaptation factor and by correcting these two quantities the position error already will be kept very small after the first check.

A similar situation exists with respect to the heading error (full line K). In this case a rather large residual error actually remains even after the position check. This might be due to a transversal speed of the vehicle which is not detected by the navigation instrument and has not been taken into consideration as a source of error. After the position check, however, the heading error is kept within a range of about ± 1', which, as can be seen, is completely sufficient for achieving high navigation accuracy. The steps in the plot of the heading error in FIG. 5 are caused by the quantification of the digital heading angle read out.

Figure 6:
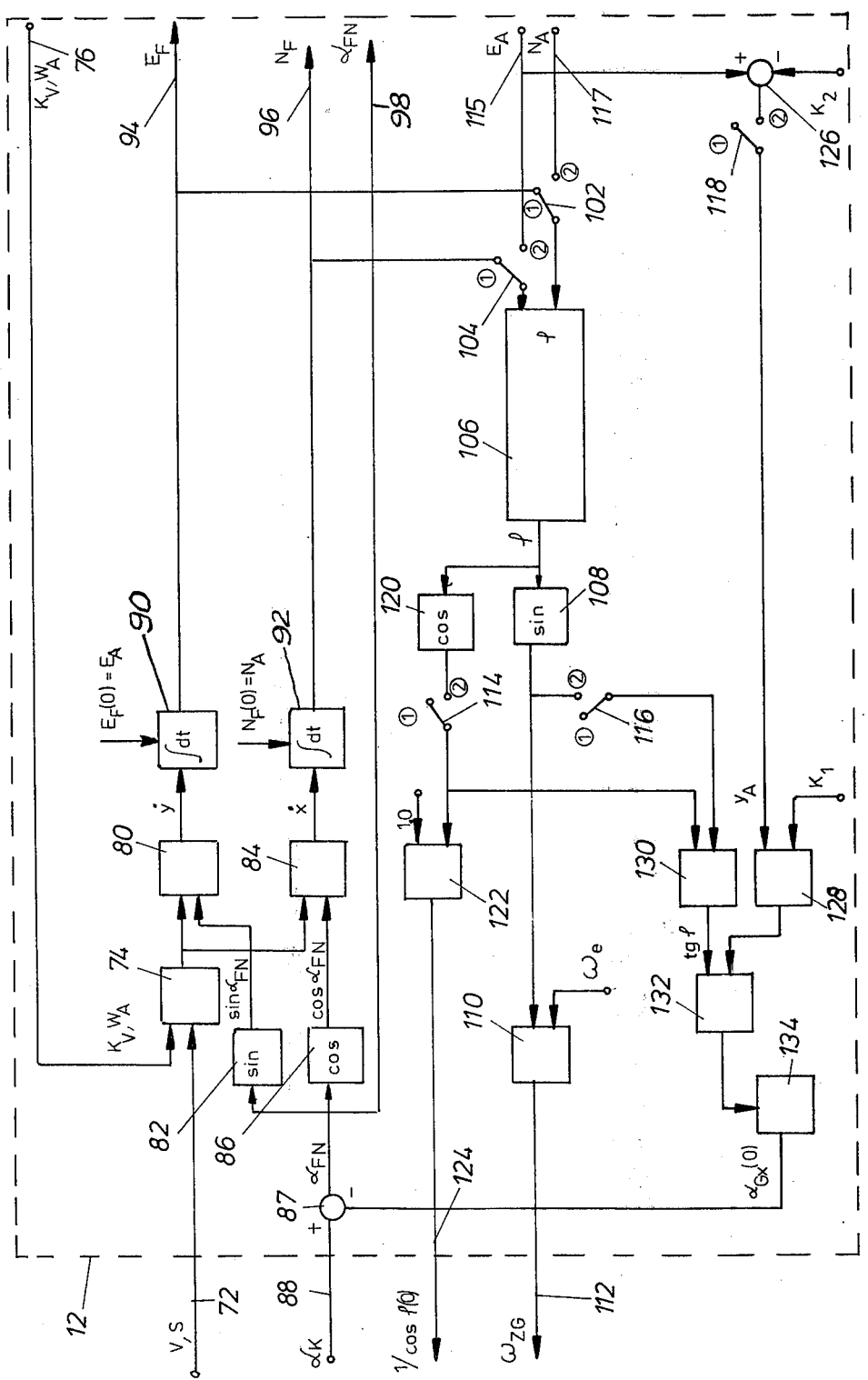
FIG. 6 illustrates details of the computer 12 of FIG. 3.

FIG. 6 illustrates details of the computer 12 of FIG. 3. The computer 12 receives a speed signal V from speed pick-up 10 at an input terminal 72. This speed signal V is multiplied by a corrective factor $k_V$ in a multiplier 74. The corrective factor $K_V$ is applied as a signal to an input terminal 76. The corrective factor $K_V$ may, at first, be set manually and thereafter be corrected by the signal from output terminal 78 of the correction computer shown in FIG. 4. The speed signal $K_V \cdot V$ thus corrected is then multiplied in a multiplier 80 by the output of a sine generator 82 and, in parallel thereto, in a multiplying element 84 by the output of a cosine generator 86. A signal representing the angle $\alpha_{FN}$ between the longitudinal axis of the vehicle and "grid north" is applied to the input terminals of the sine and cosine generators 82 and 86, respectively. This signal is formed at subtractor 87 in accordance with equation (3) as the difference between the signal $\alpha_K$, i.e., the angle between heading reference (H) and longitudinal axis of the vehicle, and the signal $\alpha_{GK}(O)$ from the indicating and control unit 20. Thus the outputs from the multipliers 80 and 84 represent $$\dot{y} = VK_V \sin \alpha_{FN}$$

and $$\dot{x} = VK_V \cos \alpha_{FN},$$

respectively. These signals are integrated with respect to time by integrators 90 and 92, the initial values $E_F(O) = E_A$ and $N_F(O) = N_A$ being fed into the integrators. The integrators 90 and 92 then supply the indicated coordinates $E_F$ and $N_F$ in the grid coordinate system to the output terminals 94 and 96, respectively. Similarly the angle $\alpha_{FN}$ provided at subtractor 87 is read out at output terminal 98 and supplied to the indicating and control unit 20, as indicated in FIG. 3 by the arrow 100. In the switch position "1" of the switches 102 and 104 the coordinates $E_F$ and $N_F$ are simultaneously supplied to a computer unit 106 which determines geographic latitude $\phi$ from these coordinates in accordance with the equations (8a) to (8e).

The signal representing the geographic latitude $\phi$ is applied to a sine generator 108 the output signal of which is sin $\phi$ and is applied to a multiplier 110. This multiplier 110 has a signal applied to its second input terminal, which signal represents the rotational speed $\omega_E$ of the earth, and provides a signal corresponding to $$\omega_{ZG} = \omega_E \sin \phi$$

at an output terminal 112. This signal is applied to the torquer 18, as illustrated in FIG. 3, to slave the gyro 16.

In order to prealign the gyro 16 and to supply the initial values $E_A$, $N_A$, the switches 102, 104 as well as switches 114, 116 and 118 are switched over from their position "1" for "navigation" to position "2" for "start". The initial value of $\phi$ then is determined by computer unit 106 from $E_A$ and $N_A$, which are applied to the input terminals 115 and 117 from the indicating and control unit 20 and is applied to a cosine generator 120. The output from the cosine generator 120 is applied to a divider 122 as the denominator quantity. The divider also receives a signal representing the number 1 as the numerator quantity. At the output terminal 124 of the divider 122 there will then be a signal $(1/\cos\phi)$ (O), which is fed to the multiplier 37 (FIG. 3) to generate a signal indicative of the deviation of the meridian gyro 26 from geographic North.

The grid convergence angle $\alpha_{GK}(O)$ in the start point, which point has the coordinates $E_A$ and $N_A$, can be determined approximately for the UTM-grid assumed here from $$\alpha_{GK}(O) = K_1(E_A - K_2)\,tg\phi$$

with
$K_1 = 16.10^{-5}$ and
$K_2 = 5.10^5\,[m]$.

To this end the difference $E_A - K_2$ is formed at subtractor 126 and is applied to a multiplier 128 through the switch 118. The outer input of the multiplier has a signal representing the factor $K_1$ applied thereto. The output signals of the sine and cosine generators 108 and 120, respectively, are applied to a divider 130 through the switches 116 and 114, respectively, to provide an output signal corresponding to the tangent of geographical latitude $\phi$. This output signal is applied to a multiplier 132 together with the output signal of the multiplier 128. The output signal of multiplier 132 represents the grid convergence angle $\alpha_{GK}(O)$ at the start point, is stored in memory 134 and is subtracted from the signal $\alpha_K$ at subtractor 87.

When the grid convergence angle is known, for example, from maps, it may also be fed into the computer through the indicating and control unit.

The computer has been described hereinbefore as an analog computer. It is, however, to be understood that it can also be designed in known manner as a digital computer, the block diagram symbolizing the sequence of the data processing steps.

I claim:

1. A navigation instrument for the navigation of land vehicles in a grid coordinate system having a north direction which does not necessarily coincide with geographic north but may differ therefrom by a grid convergence angle, said instrument being characterized by:
   (a) movement pick-up means for generating a signal representing the magnitude of longitudinal movement of the vehicle;
   (b) a gyro reference device including
      free gyro means whose spin axis establishes a reference axis and which determines the angle $\alpha_K$ between the reference axis and the longitudinal axis of the vehicle,
      means for determining geographic north and, if said reference axis initially is offset from geographic north, for subsequently producing signals representing the angles between said reference axis and geographic north;
   (c) a computer device for receiving said signals and said grid convergence angle and for generating output signals indicative of the vehicle position in said grid coordinate system; and
   (d) means forming a part of at least one of said devices for correcting for the influence of the rotation of the earth on the spin axis and said free gyro means.

2. An instrument as set forth in claim 1, wherein said means for determining north is a north seeking meridian gyro means.

3. A navigation instrument as set forth in claim 2, wherein the last mentioned means generates a follow-up signal $$\omega_{ZG} = \omega_E \sin \phi$$

from the grid coordinates determined by the computer device, wherein $\omega_E$ is the speed of rotation of the earth and $\phi$ being latitude.

4. A navigation instrument as set forth in claim 2, wherein the computer device computes the deviation rate $\omega_{ZG}$ of the free gyro means from the grid coordinates and from the latitude $\phi$ derived, in turn, therefrom and to integrate said rate with respect to time, taking the initial conditions into consideration, in order to determine the angle between said gyro reference axis and said grid north direction, and also takes this angle into consideration when determining the heading angle of the vehicle axis with respect to the grid during the generation of the vehicle position output signals.

5. A navigation instrument as set forth in claim 4, wherein
   said meridian gyro means includes a gyro, a pick-off for producing signals responsive to the deviation of the gyro from wire zero position, means for highly amplifying said pick-off signals, and a torquer to exert counter torque to said gyro in response to said highly amplified signals; and
   said computer device multiplies a signal proportional to said amplified pick-off signal by the reciprocal value of the cosine of latitude of the vehicle to generate a signal indicative of the angle between said wire zero position and the grid north direction.

6. A navigation instrument as set forth in claim 1, wherein
   said movement pick-up means is a velocity pick-up producing a velocity signal; and
   said computer device determines the heading angle of the vehicle axis with respect to the grid, multiplies the velocity signal by the sine and cosine, respectively, of said heading angle to produce products, and integrates said products with respect to time, in order to produce said output signals of the computer device.

7. A navigation instrument as set forth in claim 1, wherein
   said movement pick-up means is a distance pick-up producing distance increment signals; and
   said computer device determines the heading angle of the vehicle axis with respect to the grid, multiplies a predetermined number of said distance increment signals by the sine and cosine, respectively, of said heading angle to produce products, and sums said products, in order to produce said output signals of the computer device.

8. A navigation instrument as set forth in claim 1, characterized in that the movement pick-up is a distance pick-up coupled to the vehicle drive means, said pick-up providing distance increment signals, the computer being arranged to multiply each distance increment signal or each predetermined number of distance increment signals by the size and cosine, respectively, of the respective grid angle and to sum the products thus obtained in order to derive the coordinates of the vehicle in the grid coordinate system.

9. A navigation instrument as set forth in claim 1, wherein the computer device carries out the following operations:
   (a) applies a corrective factor $W_A$ to the distance signal $S_{gem}$ measured as said movement signal or derived by integrating the velocity to provide a corrected distance signal $S$ on which the position computation is based,
   (b) computes the coordinates $x_F$, $y_F$ respecting the vehicle position in the grid coordinate system as output signals of the computer device from the grid heading angle signal $\alpha_K$ and the corrected distance signal S, (c) a reading in of the coordinates $x_S$, $y_S$ of a known geodetic point defined in the grid coordinate system, (d) forms the differences $\Delta x$, $\Delta y$ of the coordinates $x_F$, $y_F$ representing the vehicle coordinates and of the associated read in coordinates $x_S$, $y_S$ of the geodetic point, (e) determines the correction $\Delta \alpha_K$ and $\Delta W_A$ or $\Delta K_v$, respectively, of the grid heading angle signal and the corrective factor $W_A$, respectively, of the displacement signal $S_{gem}$ in accordance with the equations:

$$\Delta W_A = \frac{\Delta x \cdot S_x + \Delta y \, S_y}{S_x^2 + S_y^2}$$

$$\Delta \alpha_K = \frac{\Delta y \, S_x - \Delta x \, S_y}{S_x^2 + S_y^2}$$

wherein $S_x$ and $S_y$ are the coordinate differences between the start point of the vehicle and the said known geodetic point, (f) corrects the output signals $x_F$, $y_F$ by the said differences $\Delta x$ and $\Delta y$, respectively, and (g) continues to compute the coordinates representing the vehicle position in the grid coordinate system with the corrective factor $W_A$ corrected by the correction $\Delta W_A$ and with the grid heading angle corrected by the correction $\Delta \alpha_K$.

* * * * *

UNITED STATES PATENT AND TRADEMARK OFFICE
CERTIFICATE OF CORRECTION

PATENT NO. : 4,114,437

DATED : September 19, 1978

INVENTOR(S) : Uwe Krogmann

It is certified that error appears in the above-identified patent and that said Letters Patent are hereby corrected as shown below:

| | |
|---|---|
| Col. 2, l. 43 | "sapce" should be --space-- |
| Col. 3, l. 30 | "or" should be --of-- |
| Col. 3, l. 59 | "$Y_F$" should be --$y_F$-- |
| Col. 3, l. 64 | "$Y_S$" should be --$y_S$-- |
| Col. 3, l. 67 | "$\Delta Y$" should be --$\Delta y$-- |
| Col. 3, l. 68 | "$x, Y_F,$" should be --$x_F, y_F$-- |
| Col. 4, l. 1 | "$Y_S$" should be --$y_S$-- |
| Col. 4, l. 18 | "$Y_F$" should be --$y_F$-- |
| Col. 5, l. 67 | "torque" should be --torquer-- |
| Col. 7, l. 48 | "$Y_A$" should be --$y_A$-- |
| Col. 7, l. 67 | "$a_2 K$" should be --$a_{2_K}$-- |
| Col. 8, l. 10 | "$s^2_y$" should be --$S^2_y$-- |
| Col. 8, l. 20 | "$= a_k$" should be --$= a_K$-- |
| Col. 9, l. 33 | "[-]" should be --[-] |
| Col. 9, l. 35 | "1⁻ =" should be --1⁻ = -- |
| Col. 9, l. 59 | "1˙" should be --1⁻ -- |
| Col. 9, l. 67 | "$k_V$" should be --$K_V$-- |

UNITED STATES PATENT AND TRADEMARK OFFICE
CERTIFICATE OF CORRECTION

PATENT NO. : 4,114,437

DATED : September 19, 1978

INVENTOR(S) : Uwe Krogmann

It is certified that error appears in the above-identified patent and that said Letters Patent are hereby corrected as shown below:

Col. 11, l. 11   "outer" should be --other--
Col. 11, l. 56   "and" should be --of--
Col. 12, l. 54   "size" should be --sine--

Assignee:   "Bodenseewerk" should be --Bodenseewerk Geratetechnik GmbH

Signed and Sealed this

Twenty-sixth Day of December 1978

[SEAL]

Attest:

RUTH C. MASON
Attesting Officer

DONALD W. BANNER
Commissioner of Patents and Trademarks